(12) United States Patent
Kim

(10) Patent No.: US 7,236,481 B2
(45) Date of Patent: Jun. 26, 2007

(54) SYSTEM AND METHOD FOR PROCESSING MULTIMEDIA PACKETS FOR A NETWORK

(75) Inventor: Ho-Kyun Kim, Seoul (KR)

(73) Assignee: LG-Nortel, Co., Ltd., Seoul (KR)

( * ) Notice: Subject to any disclaimer, the term of this patent is extended or adjusted under 35 U.S.C. 154(b) by 1036 days.

(21) Appl. No.: 10/026,781

(22) Filed: Dec. 27, 2001

(65) Prior Publication Data

US 2002/0085582 A1    Jul. 4, 2002

(30) Foreign Application Priority Data

Dec. 28, 2000    (KR)    ................ 2000-84681

(51) Int. Cl.
*H04Q 7/24*    (2006.01)
(52) U.S. Cl. ............... 370/338; 370/445; 370/448
(58) Field of Classification Search .......... 370/448, 370/447, 445, 338, 465, 411
See application file for complete search history.

(56) References Cited

U.S. PATENT DOCUMENTS

| | | | | |
|---|---|---|---|---|
| 5,329,531 | A * | 7/1994 | Diepstraten et al. | 370/347 |
| 5,936,962 | A * | 8/1999 | Haddock et al. | 370/446 |
| 5,963,560 | A * | 10/1999 | Kalkunte | 370/448 |
| 6,172,984 | B1 * | 1/2001 | Beyda et al. | 370/448 |
| 6,404,772 | B1 * | 6/2002 | Beach et al. | 370/443 |
| 6,430,192 | B1 * | 8/2002 | Creedon et al. | 370/428 |
| 6,519,636 | B2 * | 2/2003 | Engel et al. | 709/223 |
| 6,522,650 | B1 * | 2/2003 | Yonge et al. | 370/390 |
| 6,556,582 | B1 * | 4/2003 | Redi | 370/443 |
| 6,606,327 | B1 * | 8/2003 | Lowe et al. | 370/448 |
| 6,721,331 | B1 * | 4/2004 | Agrawal et al. | 370/448 |
| 6,741,559 | B1 * | 5/2004 | Smeulders et al. | 370/230 |
| 6,813,260 | B1 * | 11/2004 | Fogle | 370/338 |
| 2002/0163933 | A1 * | 11/2002 | Benveniste | 370/465 |

OTHER PUBLICATIONS

Deng et al, A Priority Scheme for IEEE 802.11 DCF Access Method, IEICE, pp. 96-102, Jan. 1999.*

* cited by examiner

*Primary Examiner*—Frank Duong
(74) *Attorney, Agent, or Firm*—KED & Associates, LLP

(57) ABSTRACT

The present invention relates to a system and method for multimedia packet processing and, in particular, to a system and method for processing video or audio data in real time or near real time. The transmission of ordinary data packets that can tolerate a certain amount of delay is deferred so that video or audio packets can be transmitted ahead of ordinary data packets. The deferred data packets are stored in the second buffer module of the dual buffer module. After all of the video packets or audio packets are transmitted, the deferred data packets are transmitted prior to the transmission of other waiting data packets stored according to a related art back-off process.

19 Claims, 3 Drawing Sheets

SYSTEM AND METHOD FOR PROCESSING MULTIMEDIA PACKETS FOR A NETWORK

BACKGROUND OF THE INVENTION

1. Field of the Invention

The present invention relates to a system and method for processing multimedia packets and, in particular, to a system and method for processing multimedia packets for access in real time or near real time.

2. Background of the Related Art

The ordinary function of a Media Access Control (MAC) layer of a local area network (LAN) is to enable many stations to access common channels with minimum interference and with a high performance rate. Generally, the Carrier Sense Multiple Access (CSMA)/Collision Avoidance (CA) method is used. This is a contention-based method of the asynchronous traffic, in which all stations have equal rights to access the network. In this method, Request To Send (RTS) and Clear To Send (CTS) confirmation functions are added to the collision avoidance function for securing stability in packet transmission.

The related art MAC processor of a wireless LAN conducts exponential random back-off process using the CSMA/CA method for data transmission. The exponential random back-off processes are conducted whenever the medium, to which a station tries to transmit a MAC Protocol Data Unit (MPDU), is detected as busy. The back-off process is selected by an equation of the random back-off time. The back-off timer decrements by slot times in which the medium has been free. While the medium is busy, the back-off timer stops. The back-off timer restarts to decrement when the period in which the medium has been free is determined to be longer than the Distributed Inter-Frame Space (DIFS). The data transmission commences whenever the back-off timer reaches zero.

After an MPDU is transmitted, stations having other MPDU conduct the above-described back-off process. Here, it is necessary to ensure that stations have fair and equal chances to access the medium. While multiple stations are waiting and the random back-off process is conducted, the station that selected the shortest waiting time through the random function wins in the access contention.

The above-described method has strength in that fair access is ensured based upon the first-come, first-served, principle because the station which lost in a contention has a shorter back-off delay period after the next DIFS than other stations which participated in the back-off for the first time.

FIG. 1 is a diagram illustrating the back-off process of a MAC processor in a related art wireless LAN. As shown therein, the back-off process is conducted in order to enable a station that is waiting comparatively for a long time to have an increased chance for accessing the channel. The waiting time for a station that has lost in a prior contention is decreased. When the RTS/CTS message exchange is conducted, a collision occurs only if two or more stations select a same time slot. Then, these stations reenter the contention status with contention window values, which increase in number exponentially.

For example, if a station wants to send data, but the channel is already occupied, the station must wait until the prior use finishes. After a DIFS time elapses, a time slot within the back-off window is randomly selected.

Then, a station that selected the initial time slot starts transmission. Only if two or more stations selected the same time slot will a collision occur. A station that lost in the contention because another station selected the initial time slot freezes the back-off counter. In the immediately following contention, the station that has lost in the previous contention is provided with a high priority as it waits for the remaining time slot.

The related art system and method for processing multimedia packets have various disadvantages. For example, where audio or video are transmitted, the data transmission is often suspended due to the delayed access. Also, in the related art random back-off method, randomly determining the transmission priority based upon the transmission rate may significantly affect the throughput. Therefore, in the related art wireless LAN, it has been virtually impossible to process audio or video data in real time due to such problems.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a multimedia packet processing system and method in a wireless LAN in which packets requiring real-time transmission may be more quickly transmitted.

Another object of the present invention is to provide a multimedia packet processing system an method in a wireless LAM in which packets requiring real time transmission take priority over other packets to be transmitted on a network.

In order to achieve at least the above objects in whole or in part, and in accordance with the purposes of the invention, as embodied and broadly described, there is provided a multimedia packet processing system, including a dynamic back-off access module configured to set back-off timers to establish a transmission sequence for packets and further configured to set a priority of the packets in order to transmit a higher priority packet before a lower priority packet, a priority preemption module configured to modify the transmission sequence for the packets in accordance with the priority of packets determined by the dynamic back-off access module, and a buffer configured to store and transmit the packets in accordance with the sequence of the priority preemption module.

To further achieve at least the above objects in whole or in part, and in accordance with the purposes of the invention, as embodied and broadly described, there is provided a method of processing multimedia packet, including establishing a priority of data packets to be transmitted, suspending a transmission of data packets being transmitted if higher priority packets are inputted and enabling the higher priority packets to preempt lower priority data packets in the transmission sequence, storing the preempted data packets, transmitting the higher priority packets, and transmitting the stored preempted data packets, after the higher priority packets have been transmitted.

To further achieve at least the above objects in whole or in part, and in accordance with the purposes of the invention, as embodied and broadly described, there is provided an apparatus for processing packets, including a first buffer configured to store packets for transmission, a first logic device configured to sequence the stored packets according to a priority, a second logic device configured to preempt a packet of a first priority in the sequence with a packet of a second priority, a second buffer configured to store the preempted packet, a transmitter configured to transmit the packet of the second priority before transmitting the preempted packets, and further configured to transmit the preempted packet upon completion of the transmission of the packet of the second.

To further achieve at least the above objects in whole or in part, and in accordance with the purposes of the invention, as embodied and broadly described, there is provided an apparatus for processing packets, including means for suspending the transmission of data packets being transmitted if higher priority packets are inputted and enabling the higher priority packets to preempt data packets in the transmission sequence, means for storing the preempted data packets, means for transmitting the higher priority packets, and means for transmitting the stored preempted data packets, after the higher priority packets have been transmitted.

To further achieve at least the above objects in whole or in part, and in accordance with the purposes of the invention, as embodied and broadly described, there is provided an apparatus for processing packets, including means for suspending the transmission of data packets being transmitted if higher priority packets are inputted and enabling the higher priority packets to preempt data packets in the transmission sequence, means for storing the preempted data packets, means for transmitting the higher priority packets, and means for transmitting the stored preempted data packets, after the higher priority packets have been transmitted.

To further achieve at least the above objects in whole or in part, and in accordance with the purposes of the invention, as embodied and broadly described, there is provided the method of transmitting a packets on a wireless network, including prioritizing the packets according the a type of packet, preempting packets of a first priority with packets of a second priority with packets of a second priority when packets of the second priority are detected, storing preempted packets in a buffer for later transmission.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Reference will now be made in detail to the multimedia packet processing at a MAC or other processor in a wireless LAN or other network according to preferred embodiments of the present invention as illustrated in the accompanying drawings.

Figure 1:
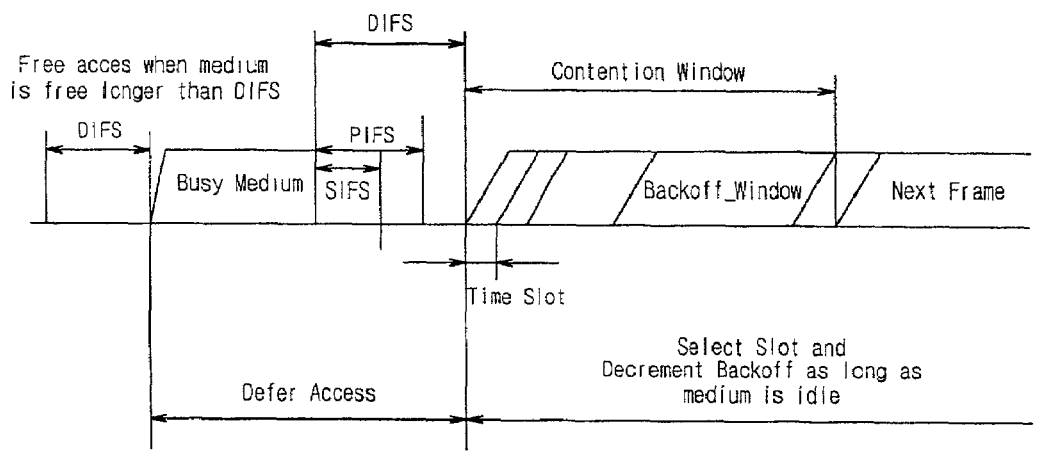
FIG. 1 is a diagram illustrating the back-off process at a MAC processor in a related art wireless LAN.
Figure 2:
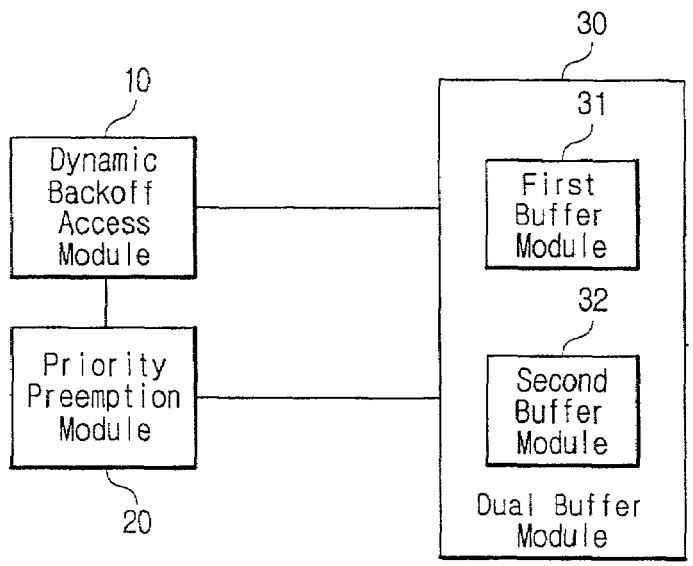
FIG. 2 is a block diagram illustrating the structure of the multimedia packet processing at a MAC processor of a wireless LAN according to a preferred embodiment of the present invention.

Referring to FIG. 2, the multimedia packet processing system according to a preferred embodiment of the present invention preferably includes a dynamic back-off access module 10, a priority preemption module 20, and a dual buffer module 30.

The dynamic back-off access module 10 preferably sets the priority of packets to be transmitted in a wireless or LAN or other network in order of video first, audio second and other data third, for example, and enables packets to be transmitted in order of such specified priority. The related art random back-off process is inappropriate for this purpose. In the preferred embodiment, the packet with higher priority, which was previously determined upon the review of the circumstances, is preferably enabled to have shorter back-off timer for early transmission. In other words, a packet of high priority (such as a video packet or an audio packet) preferably has a shorter back-off time than a data packet. As a result, real time transmission may be conducted more efficiently than with the related art random back-off process.

The dynamic back-off access module 10 preferably conducts the random back-off process if packets to be transmitted in the wireless LAN are data packets. By contrast, if a packet of higher priority (such as a video packet or an audio packet) is to be transmitted, a method for setting priority according to a certain rule is preferably used, instead of the random Contention Window (CW) method. Thus, a packet with the higher priority is preferably transmitted first.

The priority preemption module 20 preferably causes the portion in the dual buffer module 30 that has been occupied by ordinary data to be preempted by packets of higher priority (such as video packets or audio packets), the priority of which is determined in the dynamic back-off access module 10.

Real-time transmission of video or audio must be transmitted without any suspension or delay. In the related art, if the access channel is insufficient for the immediate transmission of such video packet or audio packet, the relevant packet must wait until sufficiently clear channel is available. Such waiting causes an increase of propagation delay. In order to overcome such problems of the related art system and method, the priority preemption module 20 temporarily defers the transmission of data packets that can tolerate a certain amount of delay and stores such packets in the dual buffer module 30. Then, the priority preemption module 20 transmits the relevant video packets or audio packets. After all such packets are transmitted, the preempted data packets are transmitted.

The dual buffer module 30 stores packets and transmits them in accordance with the control of the priority preemption module 20. The dual buffer module 30 preferably includes a first buffer module 31 which stores and manages the received data packets prior to a back-off process and a second buffer module 32 which stores and manages preempted data packets waiting for transmission after the transmission of high priority packets (such as video packets or audio packets).

Figure 3:
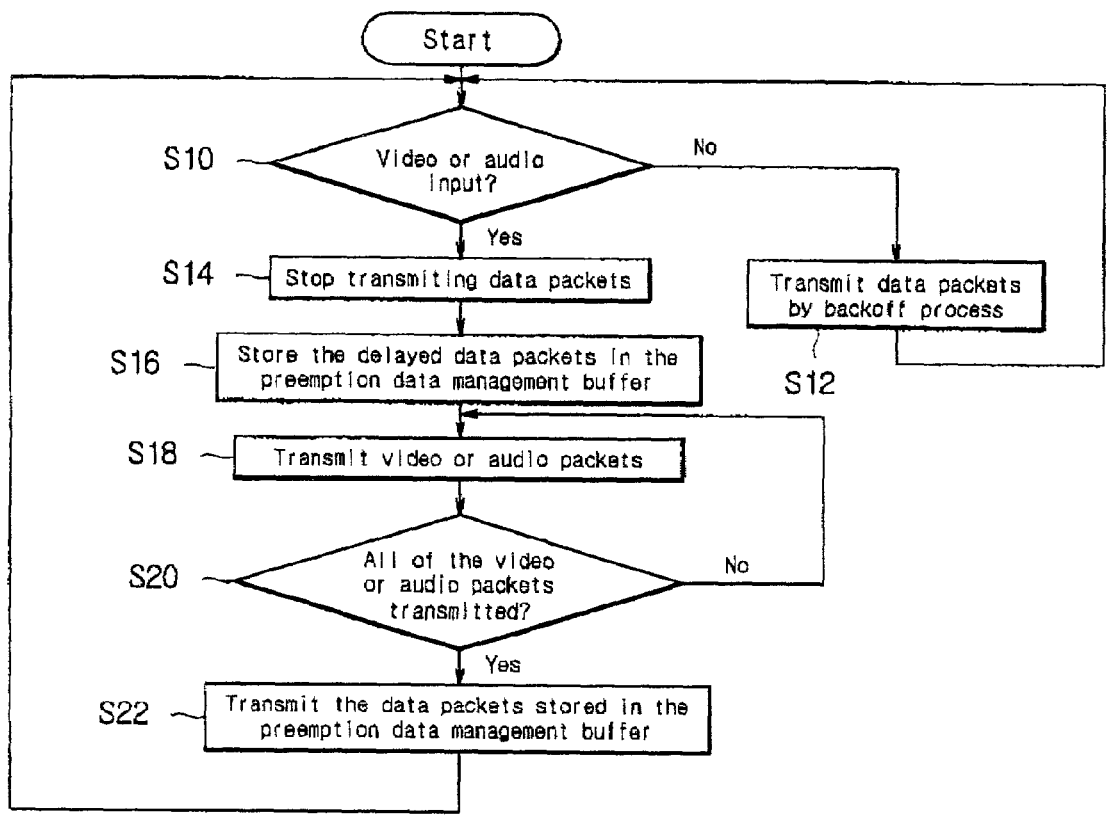
FIG. 3 is a flow chart illustrating the multimedia packet processing method at a MAC processor in a wireless LAN according to a preferred embodiment of the present invention.
Figure 4:
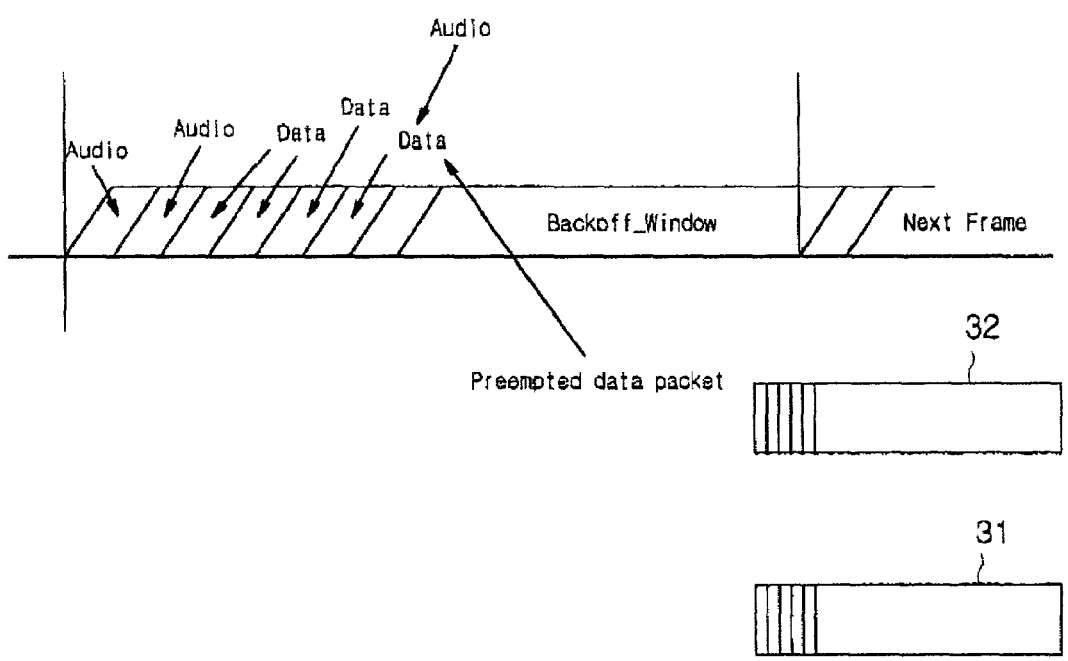
FIG. 4 is a diagram illustrating the operation of the dynamic back-off access module of FIG. 3, according to a preferred embodiment of the present invention.

The multimedia packet processing method, according to preferred embodiments of the present invention now described with references to the flow chart of FIG. 3 and the diagram of FIG. 4.

First, the dynamic back-off access module 10 preferably sets the priority of packets to be transmitted in the wireless LAN in order of video, audio and ordinary data. The dynamic back-off access module 10 preferably sets a shorter back-off time for a video packet or audio packet, which is a high priority packet, than for ordinary data packets.

Thus, while a data packet stored in the first buffer module 31 is transmitted by occupying a given time slot, the dynamic back-off access module 10 preferably determines whether any video or audio packet with higher priority has been inputted (S10).

If it is determined in step S10 that no video or audio packet with higher priority than the data packet being transmitted has been inputted, the dynamic back-off access module 10 preferably attempts to conduct the media access in the same manner as in the related art back-off process. The priority preemption module 20 preferably enables data packets stored in the first buffer module 31 to be transmitted in accordance with the access control of the dynamic back-off access module 10 (S12).

Alternatively, if it is determined in step S10 that a video packet or an audio packet with higher priority than the data packet waiting for transmission has been inputted, as shown in FIG. 3, the dynamic back-off access module 10 preferably sets a shorter back-off time for such high priority video packet or audio packet than for the data packets. The priority preemption module 20 preferably enables such high priority video packet or audio packet to preempt the time slot of the data packets stored in the first buffer module 31. Thus, the transmission of such preempted data packets are suspended (S14).

Then, the priority preemption module 20 preferably stores the preempted data packets in second buffer module 32 and transmits the high priority video packet or audio packet (S18).

Thereafter, it is preferably determined whether all of the relevant video packets or audio packets have been transmitted in step S18 (S20). If the transmission is completed, the data packets stored second buffer module 32 are preferably transmitted (S22).

To prevent significant propagation delay in the transmission of data packets stored in the second buffer module 32, the dynamic back-off access module 10 preferably adopts a queuing technique for the preempted data packets that were stored in the second buffer module 32. Such preempted data packets are preferably given shorter back-off times than other data packets stored in the first buffer module 31. Thus, the priority preemption module 20 preferably enables the preempted data packets stored in the second buffer module 32 to preempt the relevant time slots and be transmitted prior to other data packets stored in the first buffer module 31.

In summary, priority is preferably set in order of video, audio and other data so as to transmit a real-time video or audio packet before transmitting data packets. In the event that a higher priority packet is inputted, the transmission of data packets which can tolerate a certain amount of delay is deferred and the real-time video packet or audio packet is transmitted first. The deferred data packets are stored in the second buffer module 32. After all of the video packets or audio packets are transmitted, such deferred data packets are transmitted prior to other data packets stored in the first buffer module 31 in accordance with the back-off process. If real-time video packets or audio packets are inputted during the transmission of data, the transmission of data packets that can tolerate a certain level of delay is deferred and the video or audio packets are transmitted first through the steps described above.

The multimedia packet processing system and method according to preferred embodiments of the present invention has many advantages. For example, it is possible to transmit real-time data more efficiently than in the related art random back-off method. Moreover, it is possible to transmit real-time data without suspension.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A multimedia packet processing system, comprising:
   a dynamic back-off access module configured to set back-off timers to establish a transmission sequence for packets and further configured to set a priority of the packets in order to transmit a higher priority packet before a lower priority packet;
   a priority preemption module configured to modify the transmission sequence for the packets in accordance with the priority of packets determined by the dynamic back-off access module; and
   a buffer configured to store and transmit the packets in accordance with the sequence of the priority preemption module, the buffer comprising a first buffer module configured to store and manage data packets received prior to a back-off process of the dynamic back-off access module, and a second buffer module configured to store and manage the preempted lower priority packet waiting to be transmitted after the transmission of the higher priority packet.

2. The system of claim 1, wherein a media access control (MAC) processor comprises the dynamic back-off access module, the priority presumption module, and the buffer.

3. The system of claim 1, where the buffer transmits packets over a wireless local area network (LAN).

4. The system of claim 1, wherein the dynamic back-off access module sets a first back-off time for the higher priority packet and a second back-off time for the lower priority packet, wherein the first back-off time is less than the second back-off time.

5. The system of claim 1, wherein the dynamic back-off access module is configured to set the priority of packets to be transmitted in order of video, audio, then ordinary data.

6. The system of claim 1, wherein the priority preemption module is configured to modify the transmission sequence by preempting the lower priority packet with the higher priority packet.

7. The system of claim 6, wherein lower priority packet data that has been preempted has priority over the lower priority data that has not been preempted.

8. The system of claim 1, wherein the lower priority packet comprises an ordinary data packet and the higher priority packet comprises one of a video packet and an audio packet.

9. An apparatus for processing packets, comprising:
means for suspending the transmission of data packets being transmitted if higher priority packets are inputted and enabling the higher priority packets to preempt data packets in the transmission sequence;
means for storing the preempted data packets;
means for transmitting the higher priority packets; and
means for transmitting the stored preempted data packets, after the higher priority packets have been transmitted.

10. A method of processing multimedia packets, comprising:
establishing a priority of data packets to be transmitted;
suspending a transmission of data packets being transmitted if higher priority packets are inputted and enabling the higher priority packets to preempt lower priority data packets in the transmission sequence;
storing the preempted data packets, all the data packets being stored in a first buffer prior to transmission, and the preempted data packets being stored in a second buffer;
transmitting the higher priority packets; and
transmitting the stored preempted data packets, after the higher priority packets have been transmitted.

11. The method of claim 10, wherein storing the preempted data packets and transmitting the higher priority packets are executed simultaneously.

12. The method of claim 10, further comprising establishing the priority of packets to be transmitted in order of video first, audio second, and ordinary data packets third.

13. The method of claim 12, further comprising setting shorter back-off times for higher priority packets such that higher priority packets are transmitted before lower priority packets.

14. The method of claim 10, wherein transmitting the stored preempted data packets comprises:
determining whether all of the higher priority packets that preempted data packets in the transmission sequence have been transmitted;
prioritizing the preempted data packets over non-preempted lower priority data packets;
transmitting the preempted data packets if the higher priority packets have been transmitted; and
transmitting non-preempted data packets after the preempted data packets have been transmitted.

15. An apparatus for processing packets, comprising:
a first buffer configured to store packets for transmission;
a first logic device configured to sequence the stored packets according to a priority;
a second logic device configured to preempt a packet of a first priority in the sequence with an inputted packet of a second priority;
a second buffer configured to store the preempted packet;
a transmitter configured to suspend the transmission of the preempted packet and transmit the packet of the second priority, and further configured to transmit the preempted packet upon completion of the transmission of the packet of the second priority.

16. The apparatus of claim 15, wherein the transmitter is configured to transmit the preempted packet before transmitting any other data packets stored in the first buffer.

17. The apparatus of claim 15, wherein the packet of the second priority is one of a video packet and an audio packet, and the packet of the first priority is a data packet.

18. The apparatus of claim 15, wherein the second logic device is further configured to preempt the packet of the second priority with a packet of a third priority.

19. The apparatus of claim 18, wherein the packet of the third priority is a video packet, the packet of the second priority is an audio packet, and the packet of the first priority is a data packet.

* * * * *